US 6,454,286 B1

(12) United States Patent
Hosino

(10) Patent No.: US 6,454,286 B1
(45) Date of Patent: Sep. 24, 2002

(54) TRAVELING DEVICE FOR SMOOTH AND STABLE MOVEMENT ON UNEVEN AND INCLINED SURFACES

(75) Inventor: Haruo Hosino, Tokyo (JP)

(73) Assignee: Takenaka Komuten Co., Ltd., Osaka (JP)

(*) Notice: Subject to any disclaimer, the term of this patent is extended or adjusted under 35 U.S.C. 154(b) by 0 days.

(21) Appl. No.: 09/857,942

(22) PCT Filed: Oct. 18, 2000

(86) PCT No.: PCT/JP00/07211
§ 371 (c)(1),
(2), (4) Date: Jul. 23, 2001

(87) PCT Pub. No.: WO01/28841
PCT Pub. Date: Apr. 26, 2001

(30) Foreign Application Priority Data

Oct. 18, 1999 (JP) ............................................ 11-295135

(51) Int. Cl.⁷ ................................................ B62M 1/00
(52) U.S. Cl. .............................. 280/250.1; 280/304.1; 280/5.507; 280/5.2; 280/124.11; 280/124.111
(58) Field of Search ............................. 280/250.1, 220, 280/242.1, 304.1, 5.5, 5.504, 5.506, 5.507, 5.508, 5.52, 5.2, 5.28, 5.32, 124.1, 124.104, 124.106, 124.109, 124.11, 124.111, 755, 47.16; 297/DIG. 4; 180/907, 22, 24.02

(56) References Cited

U.S. PATENT DOCUMENTS 3,591,195 A * 7/1971 Ilon ...................... 280/5.28 X
4,128,137 A * 12/1978 Booth .................. 280/250.1 X
4,245,847 A * 1/1981 Knott ......................... 280/5.2
4,310,167 A * 1/1982 McLaurin ................. 280/5.28
5,937,959 A * 8/1999 Fujii et al. ............. 180/65.1 X
5,964,473 A * 10/1999 Degonda et al. ......... 280/250.1
6,199,647 B1 * 3/2001 Schaffner et al. .......... 180/65.1
6,206,119 B1 * 3/2001 Wu .................... 280/124.11 X
6,279,927 B1 * 8/2001 Nishihira et al. ............. 280/43

FOREIGN PATENT DOCUMENTS

| JP | 42-77342 | | 6/1977 |
| JP | 58063575 A | * | 4/1983 |
| JP | 4-158864 | | 6/1992 |
| JP | 4-158864 A | * | 6/1992 |
| JP | 10085261 A | | 4/1998 |
| WO | WO98/55066 A1 | * | 12/1998 |

* cited by examiner

Primary Examiner—F. Zeender
(74) Attorney, Agent, or Firm—Oliff & Berridge, PLC

(57) ABSTRACT

A traveling device such as, for example, a wheelchair or a resource carrier enabling comfortable travel on uneven ground, with its wheels moving in conformity with the ground, having a simple construction which can be manufactured at low price. The device includes a truck member with a loop frame and a body member which is supported on the truck member by a pair of links at its front and by a pair of fixed arms at its rear. The loop frame has a pair of side frame parts each of which is bendable at its lengthwise center and supported by a driven wheel at the same, and a pair of front and rear frame parts each of which is supported by a caster at the lengthwise center. Each fixed arm has an upper end fixed immovably to the body member and a lower end which is connected turnably and movably generally parallel to the traveling direction.

6 Claims, 6 Drawing Sheets

TRAVELING DEVICE FOR SMOOTH AND STABLE MOVEMENT ON UNEVEN AND INCLINED SURFACES

BACKGROUND OF THE INVENTION

1. Field of Invention

The present invention relates to a traveling device, more particularly a device for traveling easily on an uneven ground or an inclined surface.

2. Description of Related Art

Among the traveling devices, a hand-operated device such as a wheelchair usually does not have a suspension, so that it is difficult to advance on uneven ground smoothly. In a case of an electric-powered wheelchair, it is well-known art to use a spring type suspension for contacting its driving wheel to the ground effectively. In this case, however, since it is difficult to extend the stroke of the spring, its function is limited and the wheelchair is not able to ride over acutely uneven ground. Moreover, no matter whether it is hand-operated or electric-powered, an usual wheelchair has a pair of driving wheels as rear wheels and a pair of casters as front wheels, while its gravity center is located between the rear and front wheels. This means that it is difficult for the wheelchair to run straight on an one-way sloping ground, since it causes a moment for turning the body of the wheelchair downwardly.

For solving such problem, Japanese patent laid-open No. 52 (1977)-77342 proposes an electric-powered wheelchair having four driven wheels which are adapted to turn by means of power-steering. However, the structure of the wheelchair is complex and expensive. Moreover, when one of the wheels strikes and mounts a projection on the ground, the weight of the wheelchair is imposed on only the mounting wheel and the diagonally opposite wheel, such that the other two wheels are lifted up so as to reduce the stability of the wheelchair.

Japanese patent laid-open No. 10 (1998)-85261 discloses a wheelchair having a pair of left and right lower frames extending from the front to the back and supporting a pair of front wheels and a pair of rear wheels, and an upper frame for supporting a seat. Both upper and lower frames curve downwardly between the front and rear wheels. This wheelchair is adapted to improve the grounding ability of the wheels by the flexion of the frame. However, this wheelchair is not suitable enough on acutely uneven ground, similar to the one using the spring suspension.

SUMMARY OF THE INVENTION

The primary object of the present invention is to provide a traveling device such as a hand-operated or electric-powered wheelchair having each wheel which moves along and in conformity with an uneven ground so as to allow a comfortable driving thereon, structure of which is simple and able to manufacture at low price.

To achieve this object, a traveling device according to the present invention comprises:

a truck member acting as a platform and having a loop frame, and a pair of front and rear casters and a pair of left and right driving wheels for supporting the loop frame, said loop frame consisting of a pair of side frame parts and a pair of front and rear frame parts, each side frame part having a front section and a rear section divided by a bendable portion at which the side frame part is able to bend upwards and downwards, said bendable portions being formed at a pair of opposed lengthwise middle portions of the side frame parts, said pair of casters supporting a pair of lengthways middle portions of the front and rear frame parts, said pair of driving wheels supporting the pair of opposed lengthwise middle portions of the side frame parts, and allowing the truck member to move frontwards and backwards;

and a body member having a front body portion which is supported by a pair of links, and a rear body portion which is supported by a pair of fixed arms, said each link having an upper end and a lower end, the lower end of each said link being connected to the front section of the side frame part, while said each fixed arm having a lower end and an upper end, the lower end of each said fixed arm being connected to the rear section of the side frame part, wherein the upper and lower ends of the each link is rotatably connected so as to move generally parallel to a traveling direction into which the driving wheel is heading, whereby the upper end of the each fixed arm is fixed immovably, while the lower end of the each fixed arm is rotatably connected so as to move generally parallel to the traveling direction.

The secondary object of the present invention is to prevent the traveling device from being unstable due to excessive bending of the loop frame. To achieve this object, the traveling device is provided with a stopper for regulating the bending of the loop frame.

The third object of the present invention is to further improve the stability of the traveling device, particularly reducing the risk of it turning over obliquely with respect to the direction of travel. This object is achieved by providing a pair of auxiliary wheels on the both sides of the caster.

The fourth object of the present invention is to provide a traveling device with casters which are able to ride over the projection in the uneven ground with ease. To achieve this object, the present invention proposes a traveling device in which each bendable portion is located beneath (or lower than) a rotation axis of the driving wheel, or a traveling device in which each bendable portion is located beneath the rotation axis of the driving wheel and as high as a rotation center of the front caster.

The fifth object of the present invention is to further reduce the risk of the traveling device turning over obliquely with respect to the direction of travel. For this purpose, the traveling device further comprises an oscillation arm which is turnably (or rotationally) supported by a pivot axis protruding from a center of the front or rear frame part, wherein at least either of the front and rear casters is formed into a pair of casters provided at both sides of the oscillation arm.

The sixth object of the present invention is to construct the traveling device compactly by inserting a generally flat truck member below a body member as a carrier. For this purpose, the loop frame is formed into a generally horizontal form as seen from left and right sides.

DETAILED DESCRIPTION OF PREFERRED EMBODIMENTS

Figure 1:
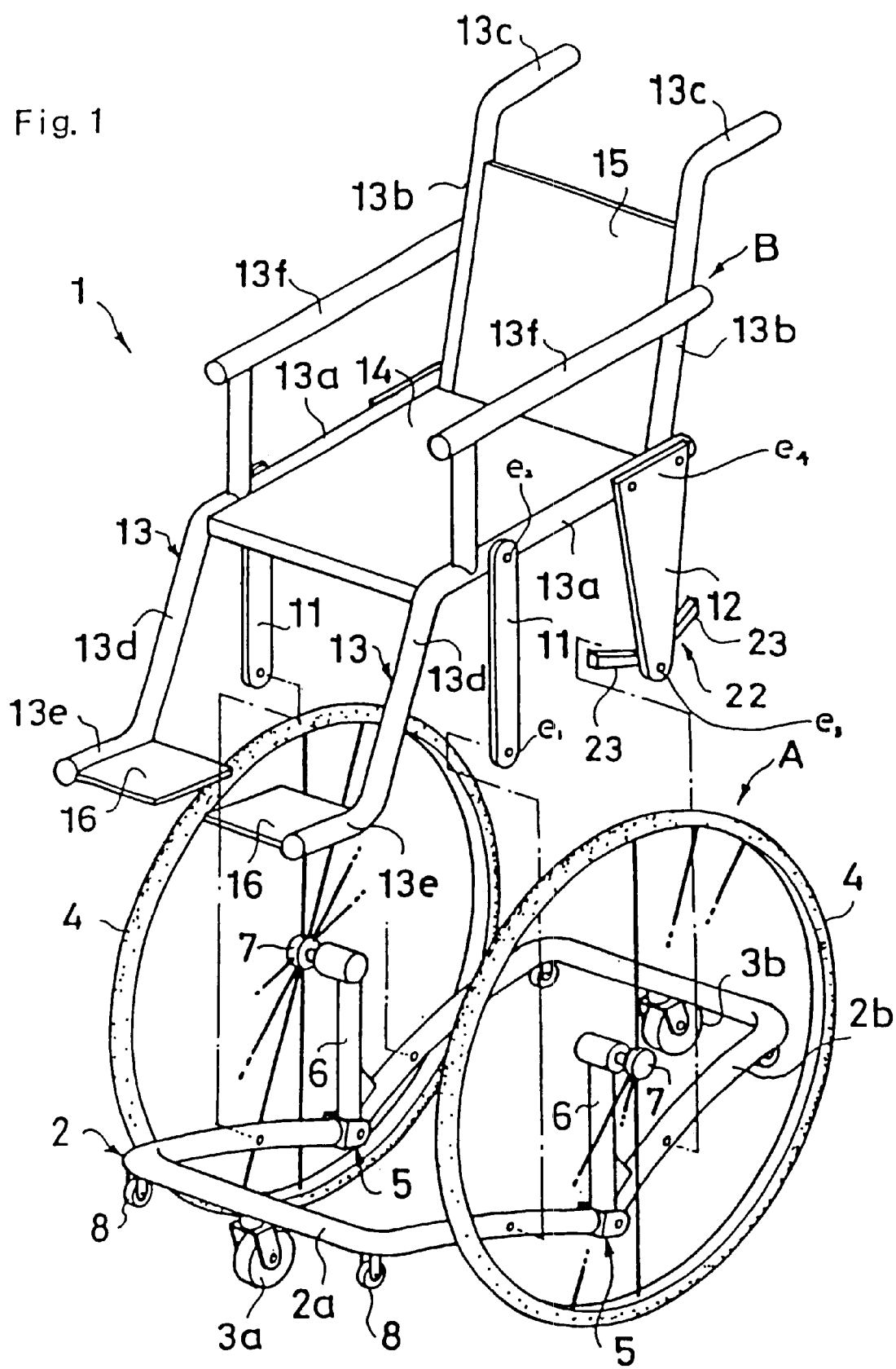
FIG. 1 is a perspective view of the traveling device according to the first embodiment of the present invention in a dissolved state.

FIGS. 1 to 12 show a first embodiment of the present invention particularly suitable as a wheelchair.

A traveling device 1 according to the present invention comprises a truck member (A) and a body member (B).

The truck member (A) acts as a platform and has a loop frame 2, and a pair of front and rear small-diameter casters (or front wheel and rear wheel) 3a, 3b, and a pair of left and right large-diameter driving wheels 4 (or middle wheels) for supporting the loop frame. Said loop frame 2 consists of a pair of side frame parts and a pair of front and rear frame parts, each side frame part is provided at its lengthwise middle portion with a bendable portion 5 at which the side frame part is able to bend upwards and downwards. The front and rear frame parts 2a, 2b are supported at their lengthwise middle portions by the pair of casters (or front wheel and rear wheel) 3a, 3b. And also the side frame parts are supported at the pair of their opposed lengthwise middle portions by the pair of driving wheels (or middle wheels) 4 which allow the truck member to move frontward and backwards. Due to such a structure, the loop frame is able to bend corresponding to an unevenness of the ground described later so as to guarantee a constant contact of the four wheels to the ground. In the present specification, the word "driving wheel" is used to imply one which is empowered by mechanical force such as electricity or human force.

The loop frame 2 is preferably formed into a rectangular shape and comprises right and left frame parts which are adapted to bend at their lengthways centers. The front and rear casters 3a, 3b and the pair of left and right driving wheels 4 are preferably provided at the lengthways center of each side of the rectangle respectively, such that these four wheels are arranged in a shape of a diamond. In the illustrated preferred embodiment, the loop frame 2 consists of a front half-frame 2a and a rear half-frame 2b. The front half-frame 2a has a pair of rear end portions furcating like a two-prong fork in which the respective front end portion of the rear half-frame 2b is connected by means of a pivot or any other suitable method so as to form the bendable portion 5 which is allowed to bend upwardly and downwardly.

Figure 2:
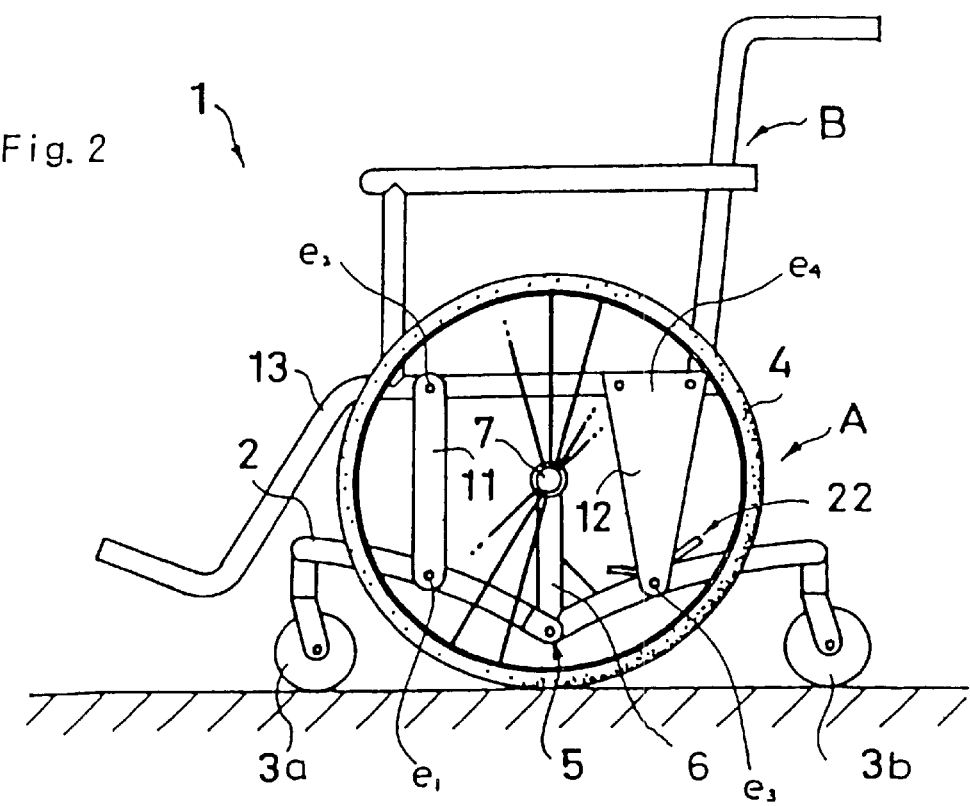
FIG. 2 is a side view of the device shown in FIG. 1.
Figure 9:
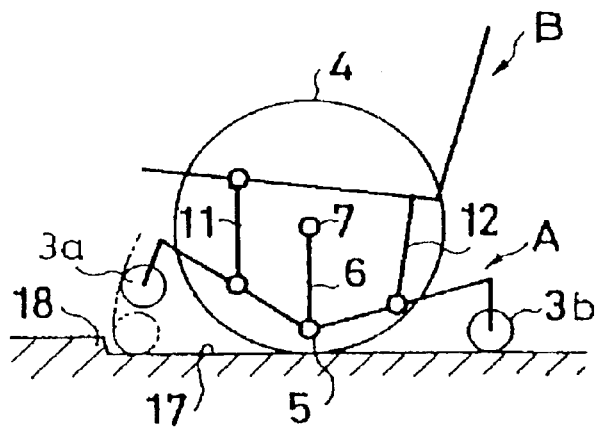
FIG. 9 is a view showing an action of the device shown in FIG. 1 when its front caster rides over the projection on the floor.

As FIGS. 2 and 9 show, the loop frame 2 is crooked at the bendable portion 5 to form a valley or V-shape in a sideway view. A pair of supporting sticks 6 are standing respectively from the front end portions of the rear half-frame 2b at their upper face in the vicinity of the bendable portion 5. The supporting sticks 6 are pivotably supporting at their uppers ends a rotation axis 7 for interconnecting the pair of driving wheels 4. This structure facilitates travel over the later-described uneven ground, since the bendable portion 5 is located in a relatively low position. However, the loop frame may be formed into an upwardly convex or inverted V-shape crooking at the bendable portion 5 as seen from sideways in a modified embodiment shown in FIG. 10. Meanwhile, when the loop frame has the valley-shaped configuration, the bendable portion 5 may be located in any position beneath the rotation axis 7, however, it is particularly preferable that the bending portion 5 is positioned generally as high as a center $0_2$ of the front caster.

Figure 3:
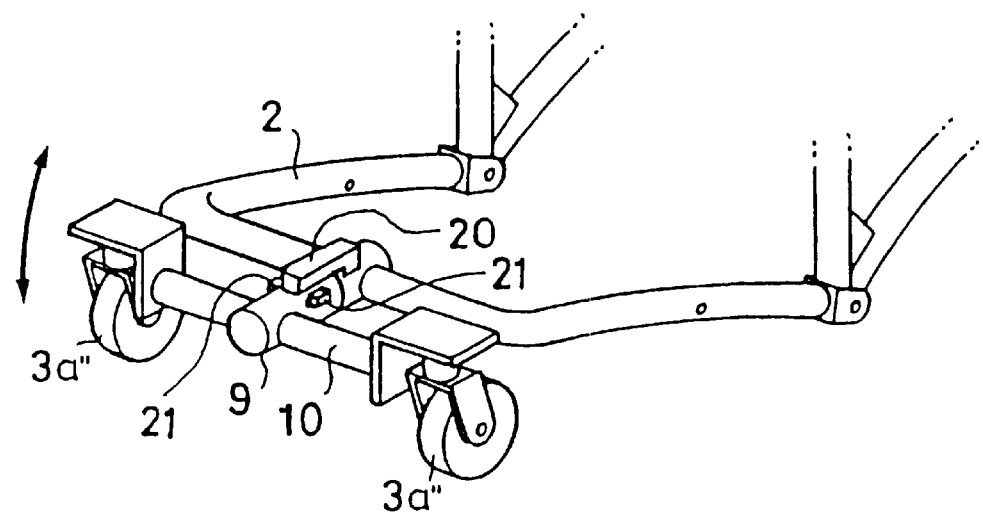
FIG. 3 is a perspective view of the essential portion of the modification of the device shown in FIG. 1.

For the purpose of stopping the truck member (A) from turning over obliquely more certainly, a pair of auxiliary wheels 8 may be provided in the truck member on the both sides of each caster 3a, 3b as shown in FIG. 1. Moreover, for the same purpose, one or both of the front and rear casters 3a, 3b may be formed into a double caster 3a", as shown in FIG. 3, which is formed by a pair of casters provided on both sides of an oscillation arm 10. The oscillation arm is provided at a pivot axis 9 protruding to left and right from its opposite sides, while the pivot axis is protruding from a center of the front face of the loop frame 2 rotatably (or rotationally) only within a required rotation angle. This double caster 3a" may be provided at either one of the front half-frame and rear half-frame of the loop frame 2, or both of them. This structure contributes to further reduce the risk of the traveling device from turning over and facilitates travel over uneven ground, since the weight applied to each wheel reduces to ½. In an embodiment shown in FIG. 3, moreover, the traveling device 1 has a horizontal protrusion 20 extending from the loop frame 2, and a pair of engagement protrusion 21,21 extending from a portion of the rotation axis, such that the horizontal protrusion 20 engages with the engagement protrusions 21, 21 for preventing the axis from rotating more than a predetermined rotation angle.

The body member (B) comprises a front body portion which is supported by a pair of links 11 respectively having a lower end e1 connected to a front section of each said side frame part, and a rear body portion which is supported by a pair of fixed arms 12 respectively having a lower end e3 connected to a rear section of each said side frame part. The front section is defined by a portion of the side frame part in front of the bendable portion 5, while the rear section is defined by a portion of the side frame part behind the bendable portion. The word "front" corresponds to the direction into which the device is traveling in FIG. 4 as shown by an arrow, and the "rear" corresponds to the opposite direction. These links 11 and fixed arms 12 may be formed in location opposite to that shown in the drawings, i.e., the fixed arm may be formed at a side of the traveling direction and the link may be formed at a side opposite to the traveling direction.

Each link 11 has an upper end e2 connected to the front body portion of the body member (B) and a lower end e1 connected to the loop frame 2 rotatably or rotationally, namely allowing rotation (or oscillation) of these upper and lower ends with respect to the loop frame 2 or body member (B) in a vertical plane including the traveling direction of the device 1. As the result of this rotation, when the traveling device advances forward and rides over the projection 18 on the floor 17 for example as shown in FIGS. 4 to 7, these upper and lower ends e2, e1 shift as indicated by arrows in the traveling direction with respect to the center axis 7 of the driving wheel 4.

The fixed arm 12 has an upper end e4 fixed to the body member (B), and a lower end e3 connected rotatably, allowing rotation (or oscillation) of the lower end e3 in the vertical plane including the traveling direction, such that the lower end shifts as indicated by arrows in the traveling direction.

The body member (B) is formed into a chair when the traveling device is a wheelchair, but may be formed into any favorable configuration corresponding to the purpose of the traveling device, of course. In a shown embodiment, the traveling device 1 has a chair-shaped body member (B) which comprises a pair of support frames 13 placed parallel on both sides of the device. The pair of support frames are defined by a pair of lateral portions 13a for spanning a seat plate 14 therebetween, and a pair of vertical portions 13b for spanning a rear board 15 therebetween, respectively erecting from the rear end of each lateral portion 13a, a pair of grip portions 13c respectively protruding backwards from the upper end of each vertical portion 13b. From the front end of each lateral portion 13a, a depending portion 13d is slanted, from the lower end of which a support portion 13e is shortly protruding forward. A pair of footrest plates 16 are protruding inwardly from the inside of the support portions 13e. Moreover, a pair of lateral L-shaped armrest 13f are provided respectively, each connecting the front part of the lateral portion 13a and the vertically lengthwise middle part of the vertical portion 13b.

Furthermore, the link 11, which is formed into a vertically long plate, is connected turnably (or rotationally) at its upper end e2 to the front part of the lateral portion 13a in the support frame, and at its lower end e1 to the front half frame 2a. The lower end e1 of the link 11 is connected turnably to the lengthwise middle part (in the direction from the front to back) of each side portion of the front-half frame 2a. And the fixed arm 12, which is formed into a vertically long and inverted isosceles triangle shape, has a wide upper end e4 fixed to the back of the rear part of the lateral portion 13a in the support frame, and a lower end e3 connected turnably to the lengthwise middle portion of the side portion of rear half-frame 2b. In this structure, the body member (B) is supported above the truck member (A) by the links 11 and the fixed arms 12.

The fixed arm 12 has a stopper 22 for regulating the bending of the loop frame 2. The stopper may be a pair of protruding rods 23,23 which are provided on the insides of the lower parts of the fixed arms capable of engaging with the upper face of the rear half frame 2b. However, the stopper may be formed into any other construction which can regulate the bending of the loop frame.

Figure 4:
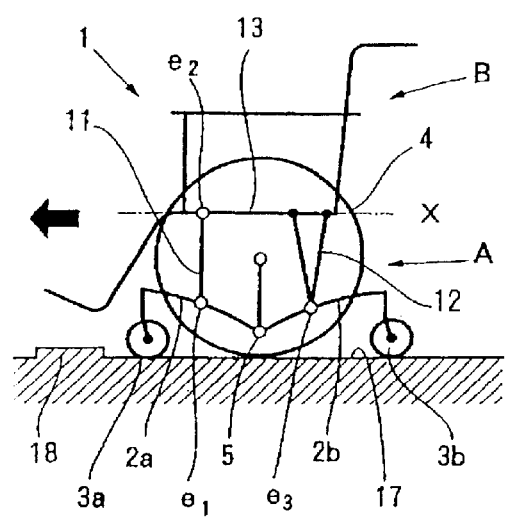
FIG. 4 is an explanation view of a state before the device shown in FIG. 1 rides over a projection on a floor.
Figure 5:
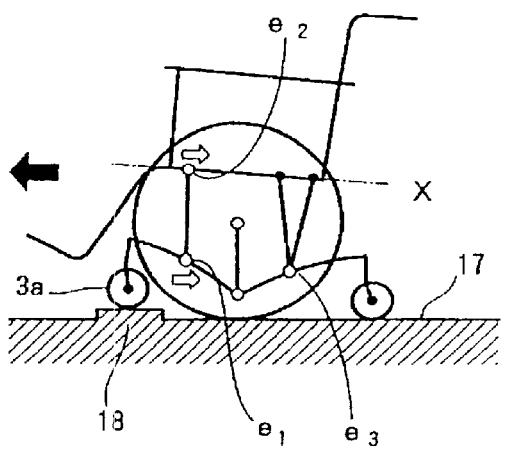
FIG. 5 is an explanation view of a state when a front caster of the device shown in FIG. 1 has ridden over the projection on the floor.

The action of the above-mentioned construction is further explained in accordance with FIG. 4 to FIG. 7. FIG. 4 shows a state in which the traveling device 1 advances towards the projection 18. When the front caster 3a collides with the projection to ride thereon as shown in FIG. 5, the upper and lower ends e2, e1 of the link 11 turn to move back and forth parallel as indicated by arrows, such that only the caster 3a is lifted up while the driving wheels 4 and the rear caster 3b keep in contact with the ground. When the traveling device 1 advances further, only the driving wheels 4 are lifted up in the FIG. 6 and so is the rear caster 3b in FIG. 7 successively, while the other two wheels keeping in contact with the ground, such that the traveling device 1 can ride over the projection 18.

Figure 6:
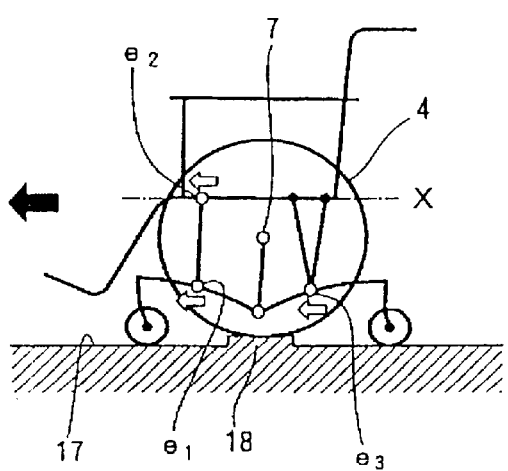
FIG. 6 is an explanation view of a state when driving wheels of the device shown in FIG. 1 have ridden on the projection on the floor.
Figure 7:
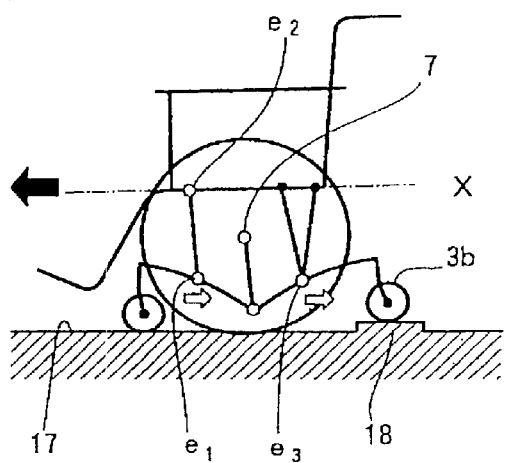
FIG. 7 is an explanation view of a state when a rear caster of the device shown in FIG. 1 has ridden on the projection on the floor.
Figure 8:
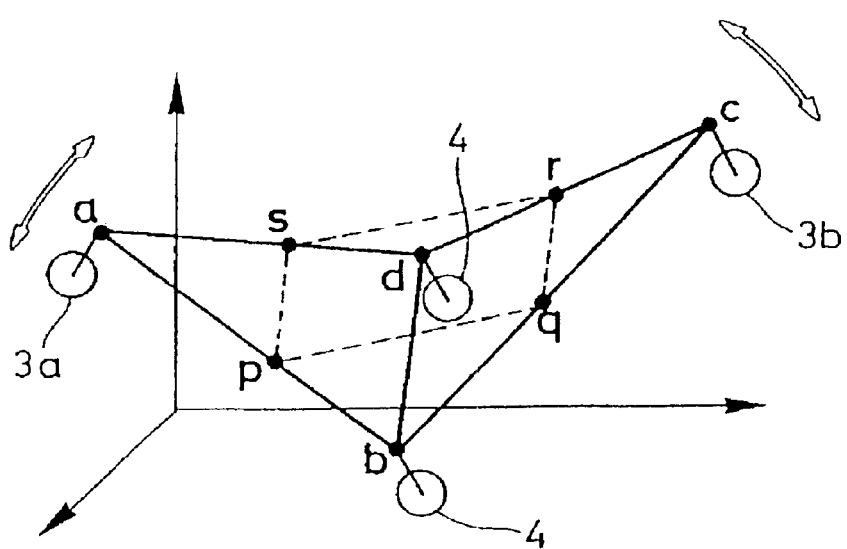
FIG. 8 is an explanation view for a mechanism of the truck member according to the present invention.

In order to explain the action of the four wheels in conformity with the unevenness of the ground more intelligibly, FIG. 8 shows a simple model which generally moves as the truck member (A) do. This model is formed by two triangles (abd) and (bcd) having a common side (bd) through which the two triangles are connected turnably to each other, and further including a front caster 3a at a vertex (a), a pair of driving wheels 4,4 at vertexes (b) and (d), and a rear caster 3b at a vertex (c). Due to this structure, one of the front caster, driving wheels, and the rear caster is able to move up and down freely with respect to the other two as shown in FIG. 5 to FIG. 7 by means of the rotation of the triangles, such that the body member rides over the projection of the floor while inclining to the front and to the back. It is to be noted that the middle points (p),(q),(r),(s) of each side of the two triangles except the common side (bd) are always on the same plane (See a numeral x in FIG. 4 to FIG. 7). This means that it is possible to support the body member (B) smoothly with respect to the four points of the model of the truck member (A) by connecting the truck member to the links 11 and the fixed arms 12 in a way the connection allows the extension and contraction of two sides (pq) and (sr) among four sides of a rectangle (pqrs) shown in FIG. 8 on the above-mentioned plane. For this purpose, the vertexes (p) and (s) are to be connected to the lower end portions e1, e1 of the links 11 supporting the front body portion of the body member (B), and the vertexes (q), (r) are connected to the lower end portions e3, e3 of the fixed arms supporting the rear body portion of the body member (B).

Moreover, it is considered that when the body member has a center of the gravity within the rectangle (pqrs), it is stable without its wheel rising from the ground. However, if the center of gravity is out of the rectangle (pqrs) and within the rectangle (abcd), the wheel opposite to the center of the gravity may rise. Contrary to the model, the actual device has the aforementioned stopper 22 for regulating the bending of the loop frame 2 so as to stop the opposite wheel from rising up in advance. Due to this, truck member is supported by three wheels and does not turn over.

Figure 10:
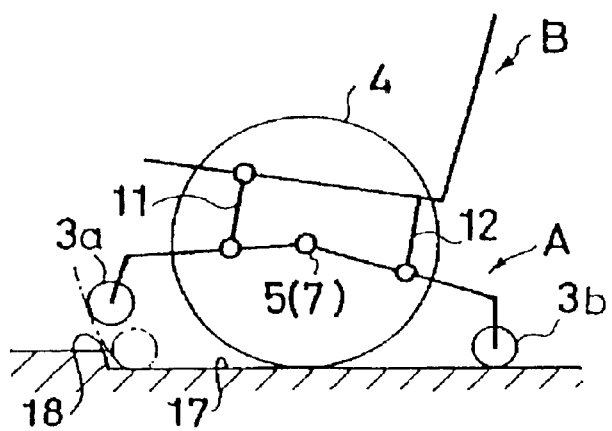
FIG. 10 is a view showing an action of a device whose bendable portion is located in a position different from that of the device shown in FIG. 1, when its front caster rides over the projection on the floor.
Figure 11:
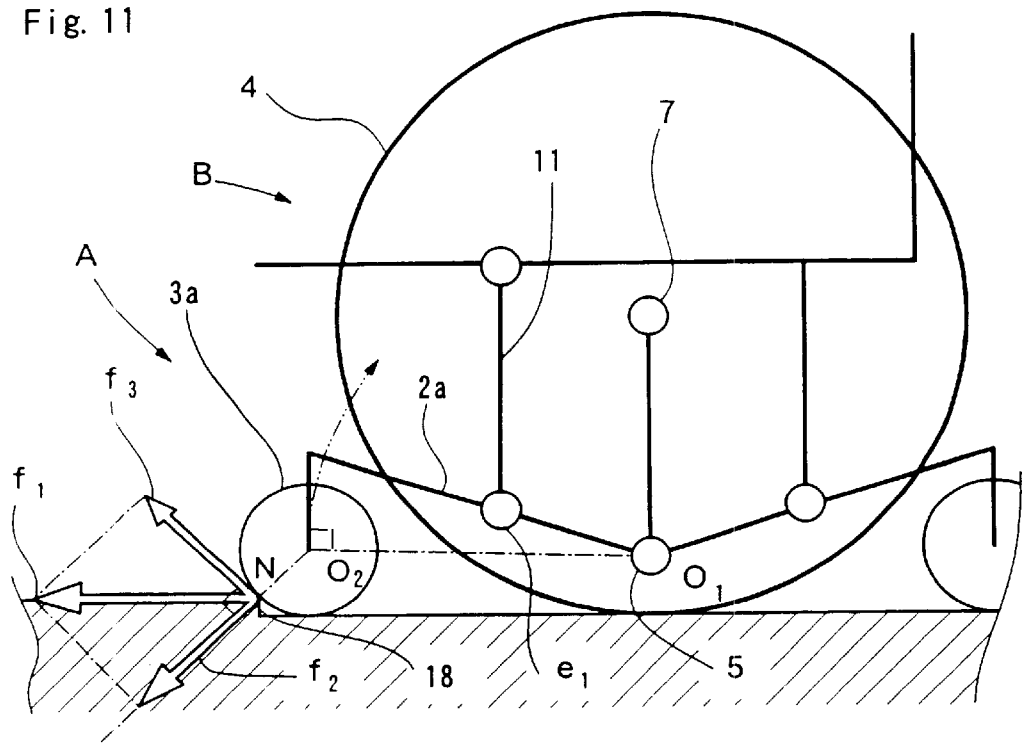
FIG. 11 is a partially elongated view for explaining an action of the front caster shown in FIG. 9.
Figure 12:
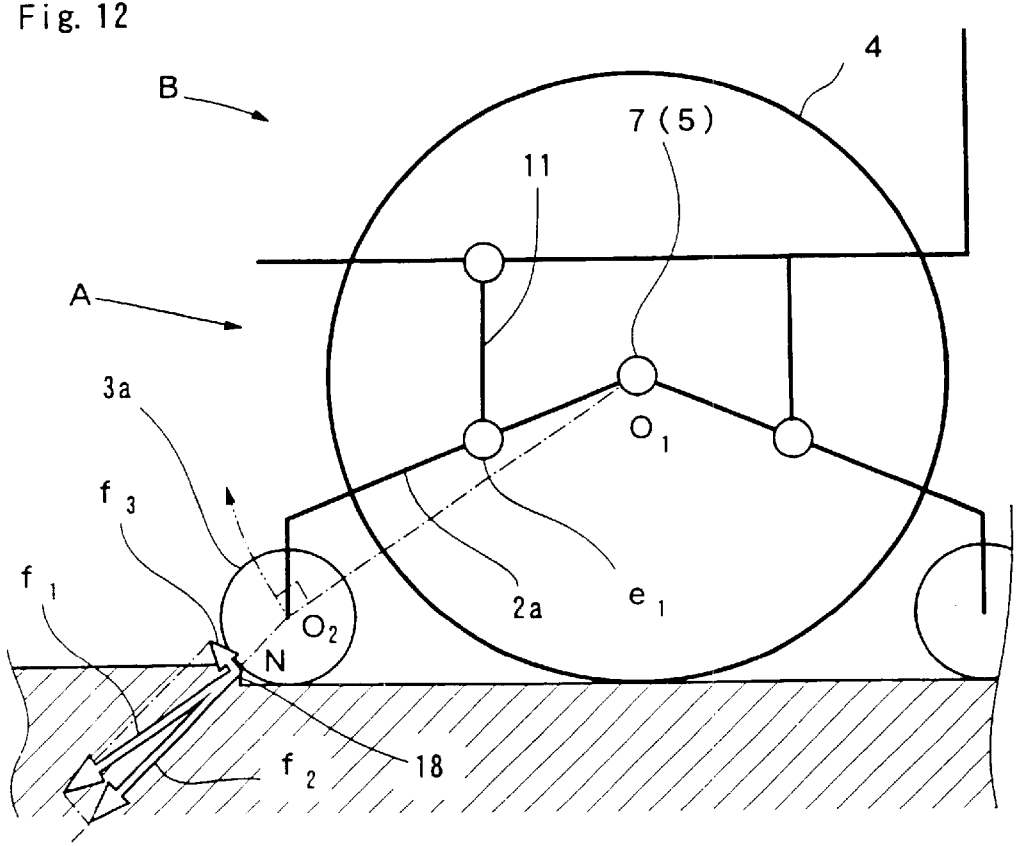
FIG. 12 is a partially elongated view for explaining an action of the front caster shown in FIG. 10.

FIG. 9 and FIG. 11 show an action and mechanism actualizing the action of the traveling device with the valley or V-shaped loop frame in side view when the front caster rides over the projection 18, in comparison with FIG. 10 and FIG. 12 showing the same on one with upwardly convex or inverted V-shaped frame.

As FIG. 11 and FIG. 12 show, when the front caster 3a is pressed against the projection 18, the front caster receives a pressing force $f_1$ which works parallel to a line $O_1O_2$ connecting the rotation center $O_1$ of the front-half frame 2a and the rotation center $O_2$ of the front caster. The pressing force $f_1$ can be divided into a component $f_2$ parallel to a line $O_2$ N connecting the center $O_2$ of the front caster and a point N of contact to the projection, and a component $f_3$ vertical to the same. Only the component $f_3$ vertical to the line $O_2$ N is effective for the front caster 3a to ride over the projection. In the structure according to the FIG. 11, the rotation center O1 of the front-half frame is positioned lower than the rotation axis 7 of the driving wheel, such that the vertical component $f_3$ in FIG. 11 is larger than that in FIG. 12, such that a load for running over the projection getting smaller in the former case.

Moreover, when the front caster 3a rides over the projection 18, the center of the caster passes along an arc having a center at $O_1$, depicted by a double-dot chain line in FIGS. 11 and 12. In the case of FIG. 12, the point $O_1$ is located higher than the center $O_2$ of the front caster touching on the ground. such that the front caster 3*a* moves front upward and rubbing the projection, such that the resistance against riding over the projection is increased. In the case of FIG. 11, on the other hand, the point $O_1$ is generally as high as the point $O_2$, such that the front caster 3*a* moves rear upward, and this enables more smooth traveling.

Figure 13:
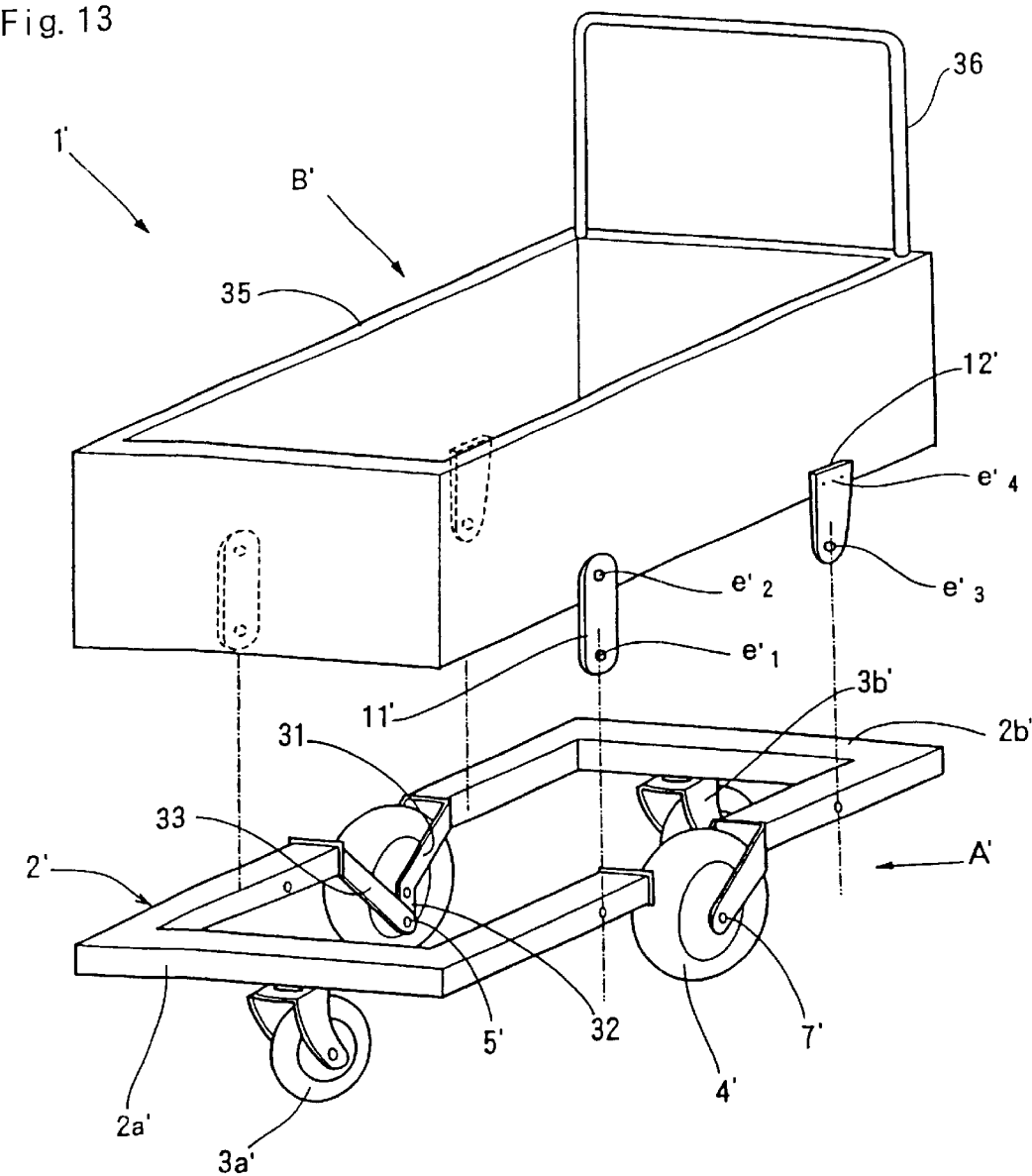
FIG. 13 is a perspective view of a traveling device according to the second embodiment of the present invention in a dissolved state.
Figure 14:
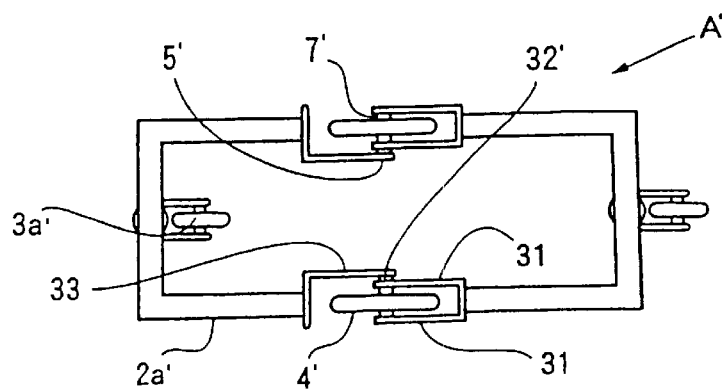
FIG. 14 is a top plan view of a truck member of the device shown in FIG. 13.

FIGS. 13 and 14 show the second embodiment of the present invention.

The traveling device according to this embodiment is particularly suitable as a resource carrier, including a truck member (A') having a loop frame 2' which has a generally horizontal shape in left or ridge side view, and a rectangular shape in a top plan view, and a box-shaped body member (B') which is connected to place above the truck member, and fixed thereto. Hereinafter, the explanation on the construction which is identical to that of the first embodiment is omitted, putting same numeral in stead.

The truck member (A') comprises a rectangular-shaped loop frame having a pair of front and rear frame parts provided at its lengthways center with front and rear casters 3*a*', 3*b*', and a pair of left and right frame parts provided at its lengthways center with a pair of left and right driving wheels 4'. The loop frame 2' may be composed by a pair of generally U-shaped front half-frame 2*a*' and rear -half frame 2*b*' having a pair of leading ends. The leading ends of the two half-frames 2*a*', 2*b*' are located inwardly and opposed to each other. Either one of the opposed leading ends is divided like a two-prong fork to form a pair of left and right support arms 31, 31, into which either of driving wheels 4', 4' is axially connected, while a connection part 33 is protruding from the other of the opposed leading ends and connected pivotably to a part of the support arm 31, such that the pivot defining the bendable portion 5'. In order to make the position of the bendable portion 5' lower, each support arm 31 and connection part 33 may preferably protrude and slant inwardly downward as shown in the drawings. For the same reason, it is preferable that the connection part 33 is connected to a pair of depending plates 32 extending downward from the point of the axial connection of the driven wheels 4'.

The body member (B') has a bottom-closed peripheral wall 35 with an open top end. The left and right side wall portions of the peripheral wall are supported at their lower ends by the links 11' and the fixed arms 12' explained in the first embodiment, lower ends of which are axially connected to the side sections of the front half-frame 2*a*' and rear half-frame 2*b*' at their outer faces. Moreover, a handrail 36 for pushing is erecting from the upper face of the back of the peripheral wall 35.

In this embodiment, the loop frame 2' is generally horizontal in left and right side view. This provides a generally flat and thin truck member except the front, rear, left and right wheels, and such truck member (A') can be set beneath the body member (B') in a compact manner.

The traveling device according to the present invention, thus constructed, may be applied to wheelchairs etc. It facilitates travel on uneven ground, on which it is considerably difficult to travel by a conventional wheelchair, has a very simple construction and may be manufactured at low cost.

What is claimed is:

1. A traveling device, comprising:
a truck member acting as a platform and having a loop frame, and a pair of front and rear casters and a pair of left and right driving wheels for supporting the loop frame, said loop frame consisting of a pair of side frame parts, a front frame part and a rear frame part, each side frame part having a front section and a rear section divided by a bendable portion at which the side frame part is able to bend upwards and downwards, said bendable portions being formed at a pair of opposed lengthwise middle portions of the side frame parts said pair of casters supporting a pair of lengthways middle portions of the front and rear frame parts, said pair of driving wheels supporting the pair of opposed lengthwise middle portions of the side frame parts, and allowing the truck member to move frontwards and backwards; and a body member having a front body portion which is supported by a pair of links, and a rear body portion which is supported by a pair of fixed arms, said each link having an upper end and a lower end, the lower end of each said link being connected to the front section of the respective side frame part, said each fixed arm having an upper end and a lower end, the lower ends of each said fixed arm being connected to the rear section of the side frame part, characterized in that said each bendable portion is located lower than a rotation axis of the driving wheel, and the rotation axis is pivotably supported by a supporting stick protruding towards the rotation axis from a vicinity of the bendable portion in the rear section of the side frame part, such that the upper and lower ends of the each link is rotatably connected so as to move generally parallel to a traveling direction into which the driving wheel is heading, whereby the upper end of each said fixed arm is fixed immovably, while the lower end of each said fixed arm is rotatably connected at the lower end so as to move generally parallel to the traveling direction.

2. A traveling device according to claim 1, further comprising a stopper for regulating a degree of bending of the loop frame.

3. A traveling device according to claim 1, further comprising a pair of auxiliary wheels which are provided on both sides of the front and rear casters.

4. A traveling device according to claim 1, wherein said each bendable portion is generally as high as a rotation center of the front caster which is grounded, such that the front caster does not protrude into an upper front direction when the front caster turns upward.

5. A traveling device according to claim 1, further comprising an oscillation arm which is turnably supported by a pivot axis (9) protruding from a center of the front or rear frame part, wherein at least either of the front and rear casters is formed into a pair of casters provided at both sides of the oscillation arm.

6. A traveling device, comprising:
a truck member acting as a platform and having a loop frame, a pair of front and rear casters and a pair of left and right driving wheels for supporting the loop frame, said loop frame consisting of a pair of side frame parts, a front part and a rear part, each side frame part having a front section and a rear section divided by a bendable portion at which the side frame part is able to bend upwards and downwards, said bendable portions being formed at a pair of opposed lengthwise middle portions of the side frame parts, said pair of casters supporting a pair of lengthways middle portions of the front and rear frame parts, said pair of driving wheels supporting the pair of opposed lengthwise portions of the side frame parts, and allowing the truck member to move frontwards and backwards; and a body member having a front body portion which is supported by a pair of links, and a rear body portion which is supported by a pair of fixed arms, said each link having an upper end and a lower end, the lower end of each said link being connected to the front section of the respective side frame part, said each fixed arm having an upper end and a lower end, the lower ends of each fixed arm being connected to the rear section of the side frame part, characterized in that the loop frame is divided into a generally U-shaped front half-frame defined by the front frame part and the front sections of the side frame parts, and a generally U-shaped rear half-frame defined by the rear frame and the rear sections of the side frame parts; wherein said front half-frame has a pair of leading ends, which are opposed, respectively, to a pair of leading ends of the said rear half-frame, and the loop frame has a pair of supporting arms, each of which is protruding from one of the opposed leading ends of the front and rear half-frames; wherein a rotation axis of each said driving wheel is rotatably connected to the supporting arm, while the supporting arm is also connected to the other of the opposed leading ends of the front and rear half-frames at the bendable portion which is located below the rotation axis of the driving wheel; wherein said loop frame is formed into a horizontal form as seen from left and right sides, and wherein the upper and lower ends of the each link is rotatably connected so as to move generally parallel to a traveling direction into which the driving wheel is heading, whereby the upper end of each said fixed arm is fixed immovably, while the lower end of each said fixed arm is rotatably connected at the lower end so as to move generally parallel to the traveling direction.

\* \* \* \* \*